US010783399B1

United States Patent
Bruno et al.

(10) Patent No.: US 10,783,399 B1
(45) Date of Patent: Sep. 22, 2020

(54) PATTERN-AWARE TRANSFORMATION OF TIME SERIES DATA TO MULTI-DIMENSIONAL DATA FOR DEEP LEARNING ANALYSIS

(71) Applicant: EMC IP Holding Company LLC, Hopkinton, MA (US)

(72) Inventors: Diego Salomone Bruno, Niterói (BR); Percy E. Rivera Salas, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 316 days.

(21) Appl. No.: 15/884,763

(22) Filed: Jan. 31, 2018

(51) Int. Cl.
| | |
|---|---|
| *G06F 16/00* | (2019.01) |
| *G06K 9/62* | (2006.01) |
| *G06N 3/08* | (2006.01) |
| *G06K 9/00* | (2006.01) |
| *G06N 20/00* | (2019.01) |
| *G06F 16/45* | (2019.01) |

(52) U.S. Cl.
CPC .......... *G06K 9/6218* (2013.01); *G06F 16/45* (2019.01); *G06K 9/00335* (2013.01); *G06K 9/6267* (2013.01); *G06N 3/08* (2013.01); *G06N 20/00* (2019.01)

(58) Field of Classification Search
None
See application file for complete search history.

(56) References Cited

U.S. PATENT DOCUMENTS

2017/0206470 A1* 7/2017 Marculescu ............ H04L 67/22
2018/0260697 A1* 9/2018 Sun .......................... G06N 3/08

OTHER PUBLICATIONS

Wang et al., "Encoding Time Series as Images for Visual Inspection and Classification Using Tiled Convolutional Neural Networks", Workshops at the Twenty-Ninth AAAI Conference on Artificial Intelligence. 2015.

* cited by examiner

*Primary Examiner* — Bai D Vu
(74) *Attorney, Agent, or Firm* — Ryan, Mason & Lewis, LLP

(57) ABSTRACT

Methods and apparatus are provided for pattern-aware transformation of time series data to multi-dimensional data for Deep Learning analysis. An exemplary method comprises: obtaining time series data and an indication of seasonal components in the time series data; obtaining the time series data separated into data chunks of a predefined length based on at least one seasonal component; aligning the data chunks based on the at least one seasonal component; generating an image and/or a multi-dimensional vector using the aligned data chunks; and applying the image and/or the multi-dimensional vector to a Deep Learning module to obtain a prediction, a classification and/or a profiling of parameters associated with the time series data. The classification of the parameters comprises, for example, an anomaly detection. The profiling of the parameters comprises, for example, a clustering of the parameters and/or a behavior identification.

20 Claims, 7 Drawing Sheets

US 10,783,399 B1

PATTERN-AWARE TRANSFORMATION OF TIME SERIES DATA TO MULTI-DIMENSIONAL DATA FOR DEEP LEARNING ANALYSIS

FIELD

The field relates generally to techniques for processing time series data.

BACKGROUND

Deep Learning has emerged as a promising field for Artificial Intelligence and Machine Learning, with applications for traditional problems, such as Natural Language Processing and Computer Vision. Deep Learning techniques have been successfully applied to image processing applications and typically require multi-dimensional inputs, such as image files.

Time series data, however, comprises a series of one-dimensional data points, typically taken over successive points in time. Thus, one-dimensional time series data cannot be readily processed by some Deep Learning algorithms that benefit from multi-dimensional inputs.

A need therefore exists for techniques for translating time series data into multi-dimensional arrays so that the transformed time series data can be efficiently processed by such Deep Learning algorithms.

SUMMARY

In some embodiments, methods and apparatus are provided for pattern-aware transformation of time series data to multi-dimensional data for Deep Learning analysis. An exemplary method comprises: obtaining time series data and an indication of seasonal components in the time series data; obtaining the time series data separated into data chunks of a predefined length based on at least one seasonal component; aligning the data chunks based on the at least one seasonal component; generating an image and/or a multi-dimensional vector using the aligned data chunks; and applying the image and/or the multi-dimensional vector to a Deep Learning module to obtain a prediction, a classification and/or a profiling of parameters associated with the time series data.

In some embodiments, the classification of the parameters associated with the time series data comprises an anomaly detection. In other embodiments, the profiling of the parameters associated with the time series data comprises a clustering of the parameters and/or a behavior identification.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods and apparatus for pattern-aware transformation of time series data to multi-dimensional data for Deep Learning analysis. The Deep Learning analysis may employ, for example, a Deep Neural Network (DNN) or a Convolutional Neural Network (CNN), as discussed further below.

In one or more embodiments, the transformation of the time series data maintains the seasonal information that is present in the one-dimensional time series data. For example, the disclosed time series transformation techniques can identify interesting patterns (e.g., seasonality and/or trends) in the time series data that share common characteristics. In some embodiments, the time series data sharing common characteristics are placed together in the generated multi-dimensional transformation to improve possible convolutional results typically present in DNNs and other Deep Learning algorithms. A strong seasonal component, for example, may belong to a region of the image (or multi-dimensional vector) and every local computation will affect not only the specific pixel, with respect to the data point, but also those pixels closely related to the data point (seasonal-wise), placed in a substantially close vicinity of the given pixel.

Figure 1:
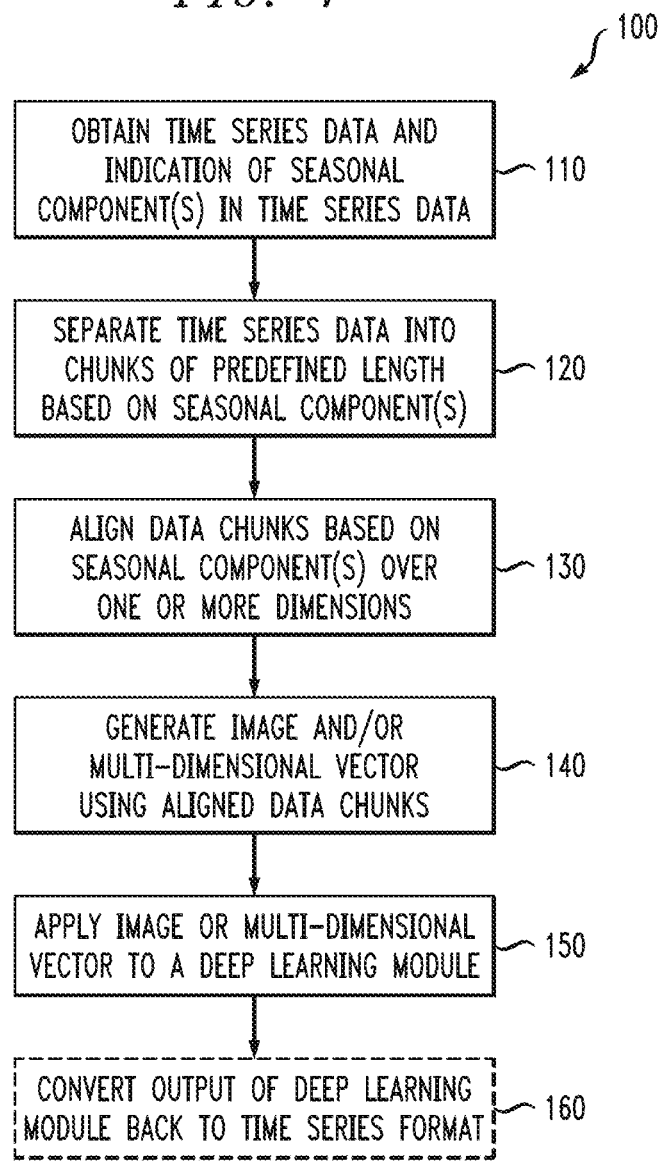
FIG. 1 is a flow chart illustrating an exemplary implementation of a time series transformation process, according to one embodiment of the disclosure.

FIG. 1 is a flow chart illustrating an exemplary implementation of a time series transformation process 100, according to one embodiment of the disclosure. As shown in FIG. 1, the exemplary time series transformation process 100 initially obtains time series data and an indication of one or more seasonal components in the time series data, during step 110, as discussed further below in conjunction with FIG. 3. The seasonal components may be extracted from the time series data, for example, using traditional approaches, such as a Seasonal Trend Decomposition approach that splits a time series into seasonality, trends and random components, or an Autoregressive Integrated Moving Average (ARIMA) model.

Thereafter, the time series data is separated into data chunks of a predefined length during step 120, as discussed further below in conjunction with FIG. 4, based on the indicated seasonal components. During step 130, the exemplary time series transformation process 100 aligns the data chunks based on the seasonal components over one or more dimensions, as discussed further below in conjunction with FIG. 5. In this manner, the chunks are stacked to respect the identified pattern. For example, as discussed further below, the data chunks can be aligned on an hourly basis for daily or weekly seasonal data.

The exemplary time series transformation process 100 generates an image and/or a multi-dimensional vector during step 140 using the aligned data chunks, as discussed further below in conjunction with FIG. 6. The generated image or multi-dimensional vector is applied to a Deep Learning module during step 150, as discussed further below in conjunction with FIG. 7. Finally, the output of the Deep Learning module is optionally converted back to a time series format during step 160.

Figure 2:
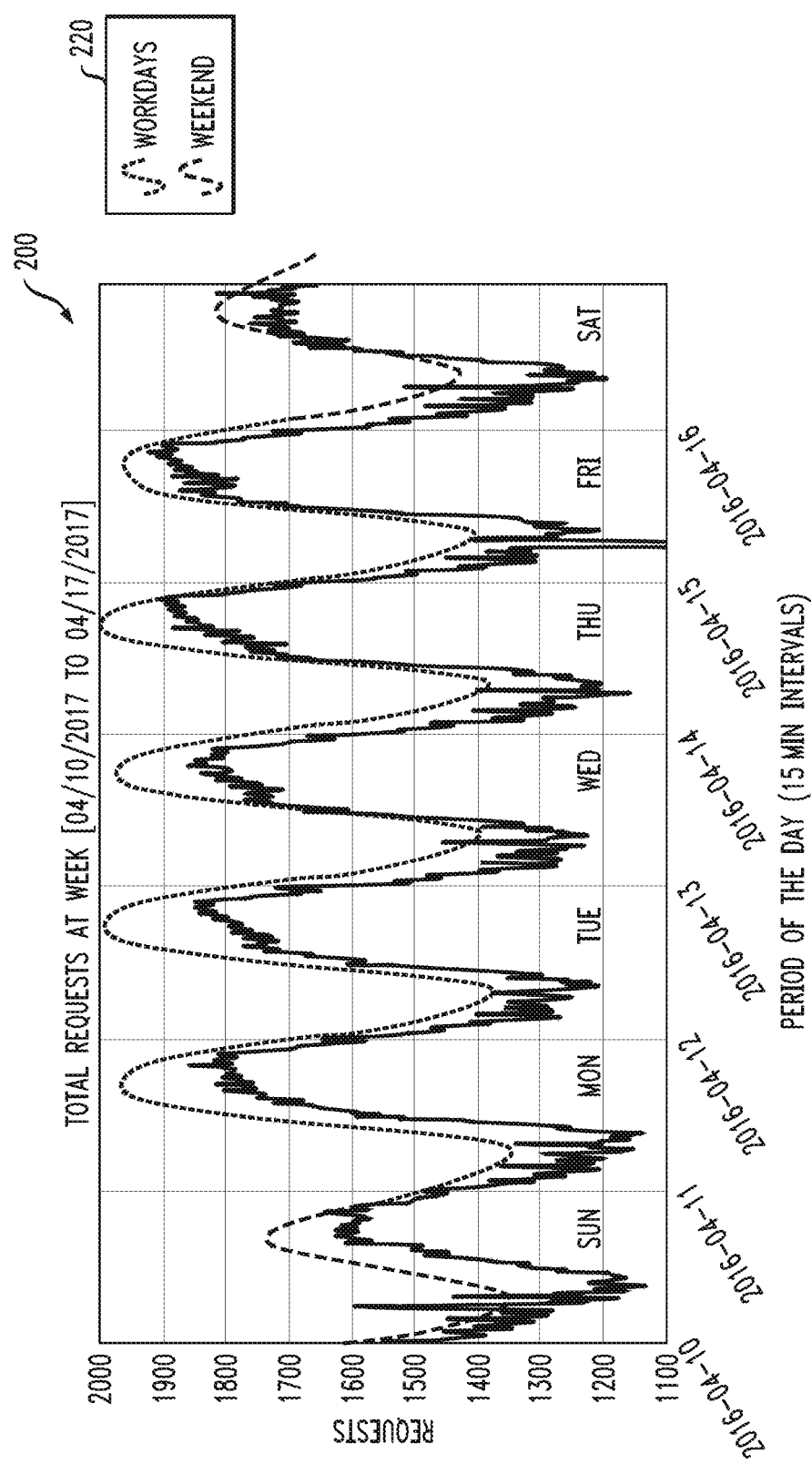
FIG. 2 illustrates exemplary time series data over the course of a given representative week, according to some embodiments.

FIG. 2 illustrates exemplary time series data 200 over the course of a given representative week, according to some embodiments. Generally, the time series data 200 of FIG. 2 corresponds to requests received by an exemplary RADIUS (Remote Authentication Dial-In User Service) server for authentication. Generally, RADIUS is a networking protocol that provides centralized Authentication, Authorization, and Accounting (AAA) management for users of a network service. For example, devices (e.g., mobile devices, modems, credit card machines and other devices) attempting to use a particular network need to be authenticated by the RADIUS server before obtaining access to the particular network. With human generated events implemented by such devices, the RADIUS servers will experience cyclic behaviors commonly found in applications where humans are the end-users.

In the example of FIG. 2, the request data 200 indicates daily and weekly seasonal aspects. For example, it may be expected to find increased activity during business hours, corresponding to daily (intra-day) seasonality. Likewise, it may be expected to find increased activity during normal business days, as opposed to weekends and holidays, corresponding to weekly seasonality.

Consider an example of predicting a load on one or more RADIUS servers with advance notice. Seasonal trends in the request data 200 can be identified, for example, using one or more of (1) Automatic ARIMA (AutoARIMA) (see., e.g., Rob Hyndman, RDocumentation, "auto.arima—Fit Best ARIMA Model To Univariate Time Series," forecast v8.1); (2) Seasonal-ARIMA (see, e.g., Stats Models, Statistics in Python "statsmodels.tsa.statespace.sarimax.SARIMAX"); and (3) seasonal-trend-random decomposition (see, e.g., Stats Models, Statistics in Python, "Seasonal Decomposition"), in a known manner. In further variations, seasonal trends in the request data 200 can be identified using a human subject matter expert. Using a Seasonal-ARIMA approach, for example, it can be shown that a 9% RMSE (root mean square error) on the prediction of a next data point (e.g., applying 10 fifteen minute data points to predict the next fifteen minute interval).

In order to apply Deep Learning techniques over the data described in conjunction with FIG. 2, the time series data could trivially be converted to single-dimensional images in a straight forward manner, for application to a DNN. If the time series-to-image transformation, however, does not account for the seasonality, then the applied image will not necessary help the DNN into leverage better results than the Seasonal-ARIMA approach described above.

As noted above, in one or more embodiments of the present disclosure, techniques are provided for pattern-aware transformation of time series data to multi-dimensional data for Deep Learning analysis, where the transformation of the time series data maintains the seasonal information that is present in the original time series data.

Consider again the example of predicting a load on one or more RADIUS servers with advance notice, where the data has been found during a pre-processing phase to have a 24 hour seasonal parameter. In accordance with the time series transformation process 100 of FIG. 1 (and as discussed further below in the following figures), the time series data is initially split into data chunks of 24 hours; and the chunks are stacked, aligned house-wise according to the identified ARIMA parameters. The stacked data is then converted to an image or a multi-dimensional array, which is then applied to a Deep Learning module, such as a Convolutional Neural Network. The example of FIG. 2 includes a key 220 where workdays (e.g., Monday through Friday) are shown with a first pattern, and weekend days (e.g., Saturday and Sunday) are shown with a second pattern.

Figure 3:
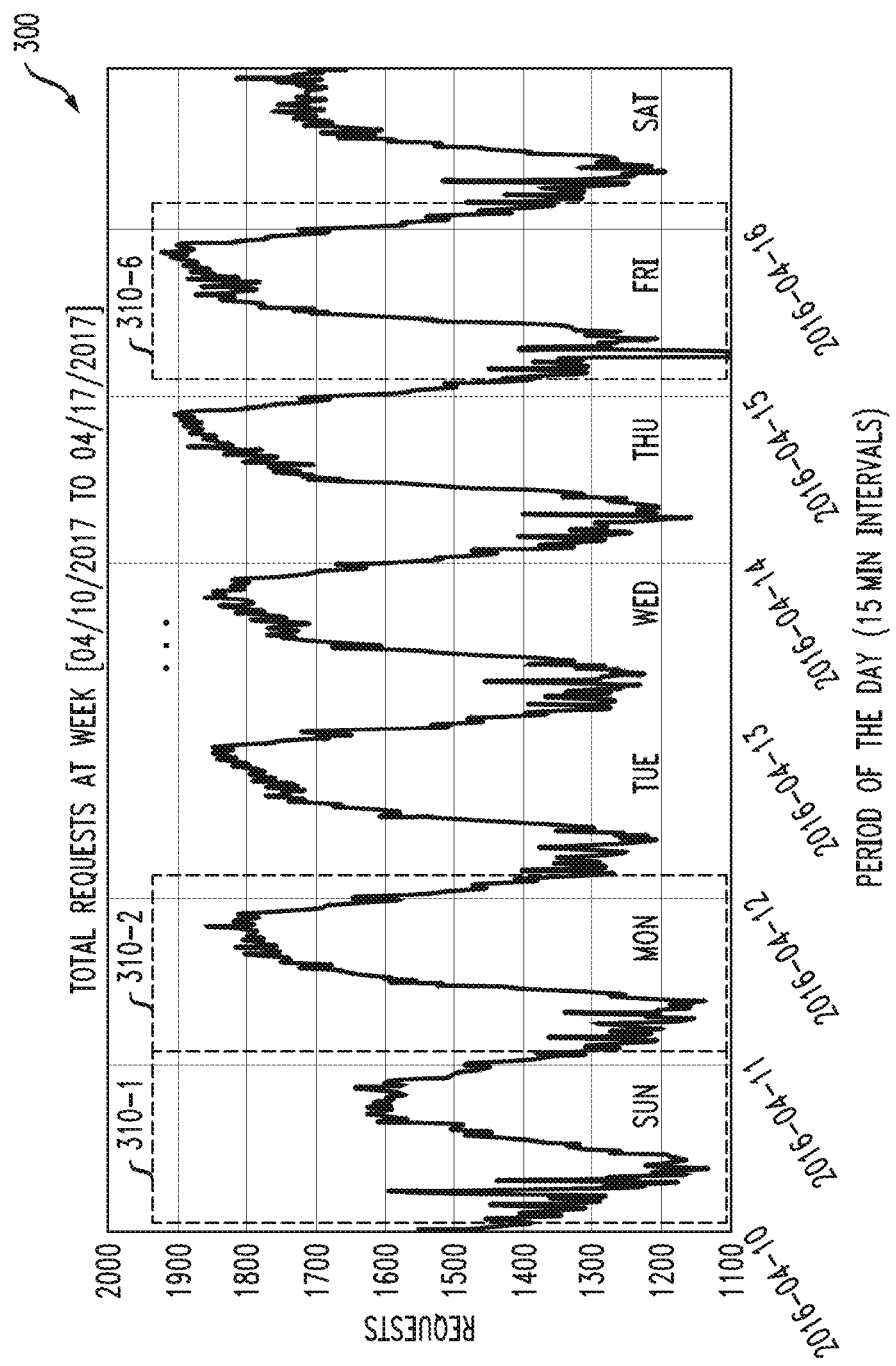
FIG. 3 illustrates an exemplary seasonal identification phase of the time series transformation process of FIG. 1, according to an embodiment.

FIG. 3 illustrates an exemplary seasonal identification phase 300 of the time series transformation process 100 of FIG. 1, according to an embodiment. As noted above, the exemplary time series transformation process 100 initially obtains or identifies one or more seasonal components in the time series data during step 110. Seasonal trends can be identified in the time series request data 200, for example, using one or more of (1) Automatic ARIMA (AutoARIMA), (2) Seasonal-ARIMA, (3) seasonal-trend-random decomposition, and (4) subject matter expert, in a known manner.

In the example of FIG. 3, the representative time series data exhibits daily seasonality, where the data presents repetitive behavior on a 24 hour basis, such as windows 310-1 (Sunday), 310-2 (Monday) and 310-6 (Friday).

Figure 4:
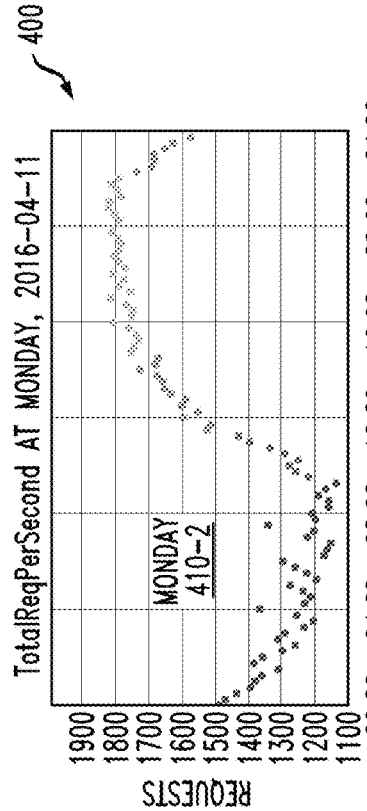
FIG. 4 illustrates an exemplary data chunking phase of the time series transformation process of FIG. 1, according to one embodiment.
Figure 4:
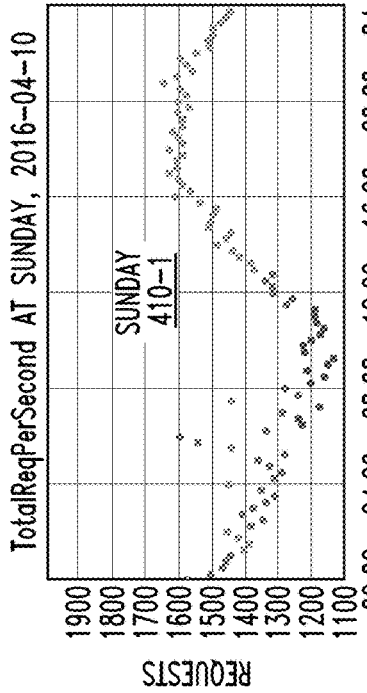
Figure 4:
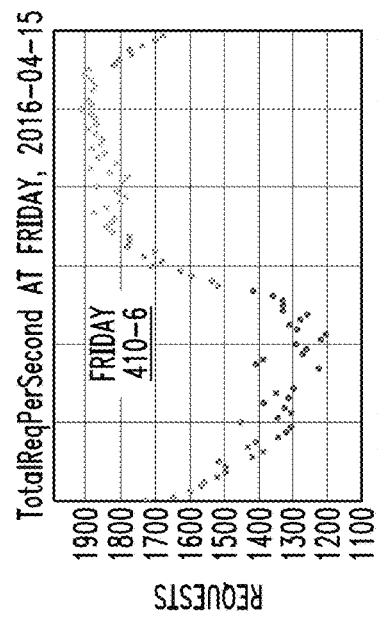
Figure 4:
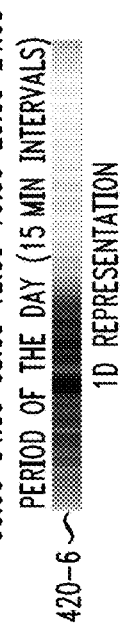

FIG. 4 illustrates an exemplary data chunking phase 400 of the time series transformation process 100 of FIG. 1, according to an embodiment. As noted above, the exemplary time series transformation process 100 separates the time series data into data chunks of a predefined length during step 120, based on the indicated seasonal components.

Thus, as shown in FIG. 4, the one week of time series data of FIG. 3 is separated into 7 one day (24 hour) data chunks. For ease of illustration, FIG. 4 illustrates three representative one day (24 hour) data chunks corresponding to Sunday 410-1, Monday 410-2 and Friday 410-6. FIG. 4 also provides the single-dimensional representation of the timeseries data (420-1, 420-2 and 420-6) encoded with a colormap 430 which, in conjunction with FIG. 5, will illustrate the next step.

Figure 5:
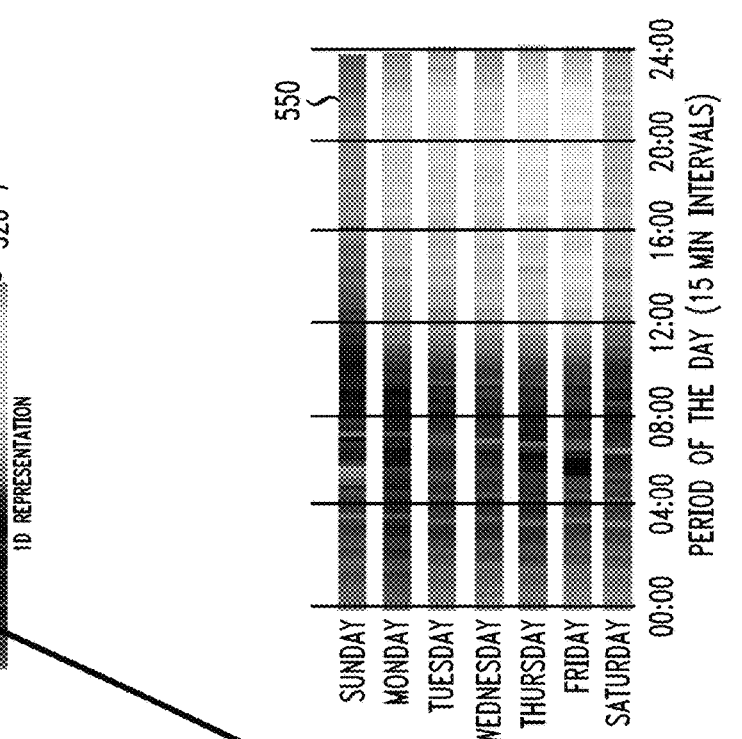
FIG. 5 illustrates an exemplary data chunk alignment phase of the time series transformation process of FIG. 1, according to some embodiments.

FIG. 5 illustrates an exemplary data chunk alignment phase 500 of the time series transformation process 100 of FIG. 1, according to one embodiment. As noted above, the exemplary time series transformation process 100 aligns the data chunks during step 130 based on the seasonal components over one or more dimensions, where the chunks are stacked to respect the identified pattern. For example, as discussed further below, the data chunks can be aligned on an hourly basis for daily or weekly seasonal data.

FIG. 5 shows an exemplary subset of the seven daily data chunks 510-1 through 510-7 of time series data corresponding to the one week of time series request data 300 of FIG. 3. Each of the seven daily data chunks 510-1 through 510-7 has a corresponding one-dimensional vector 520-1 through 520-7 that employs a color map 430 to indicate the data magnitude (e.g., the number of requests per 15 minute interval). A grey scale or color map is optionally used to enhance visual interpretation.

As shown in FIG. 5, the exemplary data chunk alignment phase 500 collects the daily data chunks 510-1 through 510-7, in sequence, and then stacks the corresponding one-dimensional vector 520-1 through 520-7 into aligned data chunks 550. Generally, each row of the aligned data chunks 550 corresponds to one day of time series request data 300. In the example of FIG. 5, the one-dimensional vectors 520-1 through 520-7 correspond to daily seasonality and are aligned by hour of the day (e.g., same hour of each day is on same column).

It is noted that in some embodiments, the exemplary data chunk alignment phase 500 can stack multiple dimensions, creating tensors (multi-dimensional vectors). For example, to process three weeks of daily data at once, one week can be placed in a "red dimension," a second week can be placed in a "green dimension," and a third week can be placed in a "blue dimension." While a human cannot perceive more than the red, green and blue dimensions, additional dimensions can still be mathematically employed.

Figure 6:
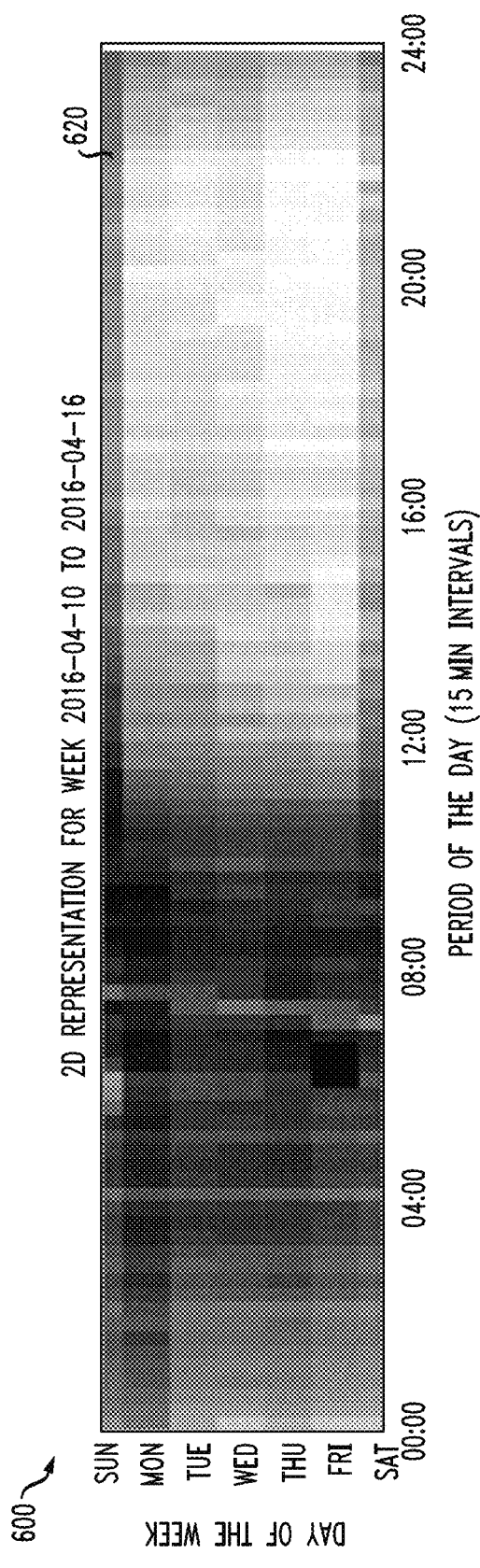
FIG. 6 illustrates an exemplary image generation phase of the time series transformation process of FIG. 1, according to an embodiment.

FIG. 6 illustrates an exemplary image generation phase 600 of the time series transformation process 100 of FIG. 1, according to an embodiment. As noted above, the exemplary time series transformation process 100 generates an image (and/or a multi-dimensional vector) during step 140 using the aligned data chunks 550 of FIG. 5.

As shown in FIG. 6, the exemplary image generation phase 600 generates an image 620 corresponding to a two-dimensional representation of the weekly data, from the aligned data chunks 550 of FIG. 5. To generate the image 620, the textual labels and blank spaces have been removed from the aligned data chunks 550, to provide the image 620. A color map 420 (as discussed above in conjunction with FIG. 4) optionally indicates a data magnitude (e.g., the number of requests per 15 minute interval), to enhance visual interpretation.

Figure 7:
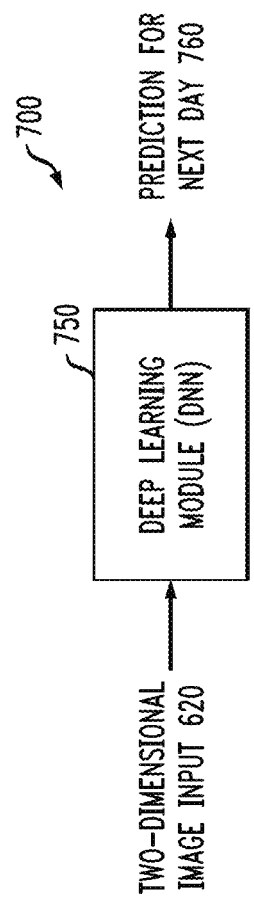
FIG. 7 illustrates an exemplary image processing phase of the time series transformation process of FIG. 1, according to some embodiments.

FIG. 7 illustrates an exemplary image processing phase 700 of the time series transformation process 100 of FIG. 1, according to some embodiments. As noted above, the exemplary time series transformation process 100 applies the image 620 (or multi-dimensional vector) from FIG. 6 to a Deep Learning module during step 150.

As shown in FIG. 7, the two-dimensional image input 620 from FIG. 6 is applied to a Deep Learning module 750, such as a Deep Neural Network. In further variations, the Deep Learning module 750 can be implemented as a Deep Neural Network, such as a VGG16 pre-trained model, or any of the object recognition models trained over the CIFAR-10 dataset. See, for example, Karen Simonyan and Andrew Zisserman, "Very Deep Convolutional Networks for Large-Scale Image Recognition," Computer Science, Computer Vision and Pattern Recognition, arXiv:1409.1556 (2014); and/or Alex Krizhevsky, "The CIFAR-10 Dataset," Learning Multiple Layers of Features from Tiny Images (2009).

In the example of FIG. 7, the applied two-dimensional image input 620 from FIG. 6 comprises one week of time series request data, and the Deep Learning module 750 provides a prediction 760 for the next day (e.g., next 24 hours). The exemplary input data has a size of 4×24×7 data points (15 minute intervals multiplied by 24 hour periods for seven days). It has been found that the disclosed time series transformation techniques, given one week of time series request data, can predict the requests for the next day with a 14% RMSE.

In further variations, three consecutive weeks of the time series request data can be appended and processed by the Deep Learning module 750, for example, to predict the following week of data (e.g., next 7 days). It has been found that the disclosed time series transformation techniques, given three consecutive weeks of time series request data, can predict the requests for the next week with a 16% RMSE.

In some embodiments, the disclosed techniques for predicting future time periods can be used in an online mode for processing a sliding window of data, and/or in an offline mode for batch processing of the data.

The Deep Learning module 750 can also process additional transformed time series data in accordance with the present disclosure to classify one or more parameters associated with the transformed time series data. In a supervised machine learning task, the input images derived from the transformed time series data could present both abnormal and normal behaviors. The transformed time series data may be fed to the Deep Learning model with each related label as output. In that case, the Deep Learning module 750 could learn how to classify further multi-dimensional inputs generated by the disclosed techniques as normal or anomalous depending on the characteristics presented on the input image.

In yet another implementation, the Deep Learning module 750 can process additional transformed time series data in accordance with the present disclosure for profiling and/or behavior identification. For example, given a series of input images or multi-dimensional vectors generated by the disclosed techniques, the Deep Learning model could cluster the pre-processed inputs in an unsupervised way to uncover related behaviors on the input data.

In some embodiments, the disclosed time series data transformation techniques leverage existing image processing techniques (e.g., Deep Learning techniques) over time series data with little, if any fine-tuning of the underlying Deep Learning module. For example, one or more parameters of the Deep Learning module 750 can be predefined by an external training routine. The training of DNNs, for example, typically adjusts weights on the neurons, in a known manner. Those adjustments may be obtained in some embodiments of the present disclosure by taking pre-trained networks from another source and applying them to the time series domain, fine-tuning its later layers to adapt to the task at hand, using the so-called transfer learning techniques. See, for example, the Wikipedia page on "Transfer Learning."

Among other benefits, the disclosed time series data transformation techniques allow traditional Deep Learning techniques, such as DNNs for Image Processing, to now be applied to the time series domain.

One or more embodiments of the disclosure provide improved methods and apparatus for pattern-aware transformation of time series data to multi-dimensional data for Deep Learning analysis. In some embodiments, the disclosed time series-to-image transformation maintains seasonal effects for analysis by the Deep Learning algorithms. The foregoing applications and associated embodiments should be considered as illustrative only, and numerous other embodiments can be configured using the techniques disclosed herein, in a wide variety of different applications.

It should also be understood that the disclosed time series data transformation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed time series data transformation techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components that implement the time series transformation process 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a time series data transformation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
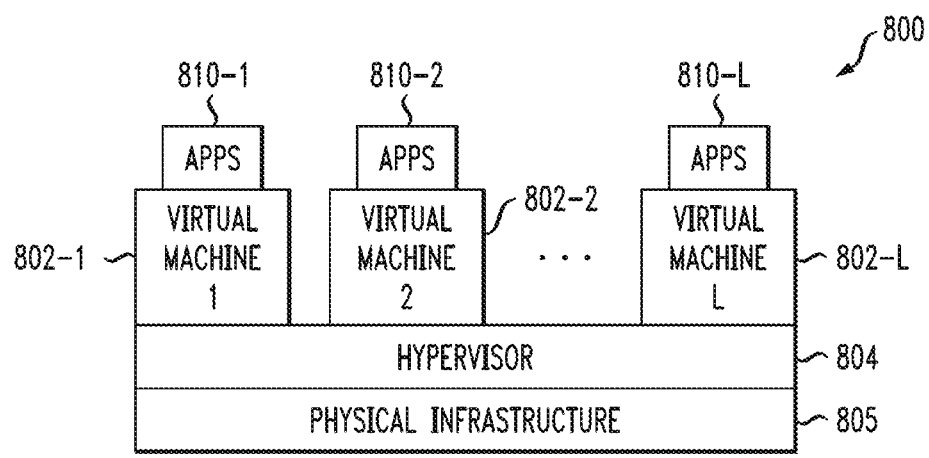
FIG. 8 illustrates an exemplary processing platform that may be used to implement at least a portion of one or more embodiments of the disclosure comprising a cloud infrastructure.

Referring now to FIG. 8, one possible processing platform that may be used to implement at least a portion of one or more embodiments of the disclosure comprises cloud infrastructure 800. The cloud infrastructure 800 in this exemplary processing platform comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

The cloud infrastructure 800 may encompass the entire given system or only portions of that given system, such as one or more of client, servers, controllers, or computing devices in the system.

Although only a single hypervisor 804 is shown in the embodiment of FIG. 8, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 804 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system used by the time series transformation process 100 in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed time series data transformation apparatus may each run on a computer, server, storage device or other processing platform element. A given such element may be viewed as an example of what is more generally referred to herein as a "processing device." The cloud infrastructure 800 shown in FIG. 8 may represent at least a portion of one processing platform.

Figure 9:
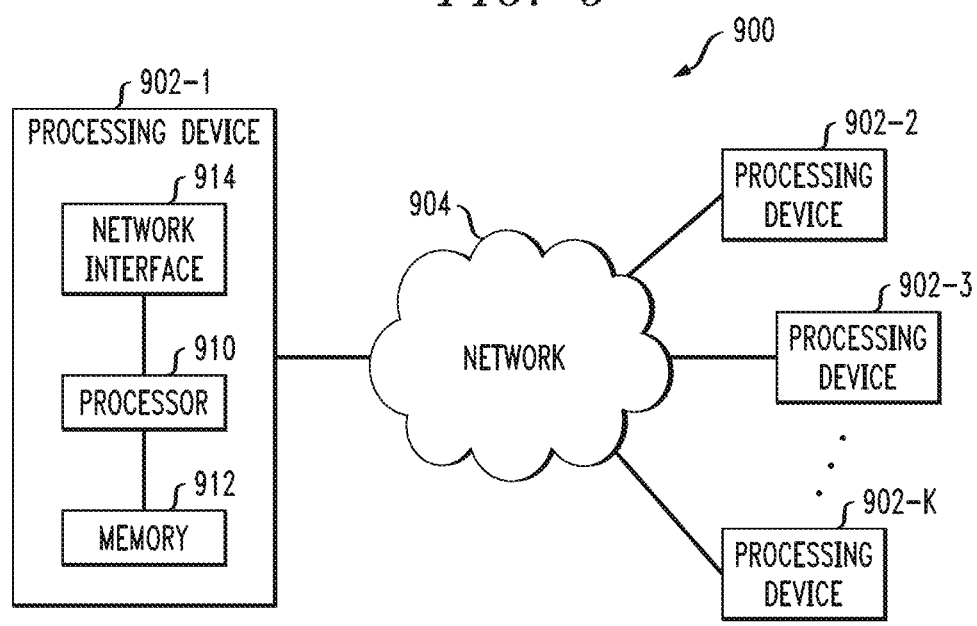
FIG. 9 illustrates another exemplary processing platform that may be used to implement at least a portion of one or more embodiments of the disclosure.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media and/or machine-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIGS. 1 and 3 through 7, for example, are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining time series data and an indication of one or more seasonal components in said time series data;
   separating the time series data into data chunks of a predefined length based at least in part on said indication of at least one of said seasonal components;
   aligning the data chunks based on said at least one seasonal component;
   generating one or more of an image and a multi-dimensional vector using the aligned data chunks; and
   applying one or more of said image and said multi-dimensional vector to a Deep Learning module to obtain one or more of at least one prediction, at least one classification and at least one profiling of one or more parameters associated with said time series data,
   wherein the method is performed by at least one processing device comprising a processor coupled to a memory.

2. The method of claim 1, wherein said one or more seasonal components in said time series data are obtained from one or more of a subject matter expert and a preprocessing algorithm.

3. The method of claim 1, wherein said one or more seasonal components comprise one or more of an hourly, a daily, a weekly, a monthly, and an annual seasonality in said time series data.

4. The method of claim 1, wherein said aligning step positions time series data in a vicinity of related seasonal data.

5. The method of claim 1, further comprising the step of stacking said data chunks based on said at least one seasonal component in a plurality of dimensions, prior to said generating step.

6. The method of claim 1, further comprising the step of converting an output said Deep Learning module back to a time series data format.

7. The method of claim 1, wherein said at least one classification of said one or more parameters associated with said time series data comprises an anomaly detection.

8. The method of claim 1, wherein said at least one profiling of said one or more parameters associated with said time series data comprises one or more of a clustering of said one or more parameters and a behavior identification.

9. The method of claim 1, wherein one or more parameters of said Deep Learning module are predefined by an external training routine prior to the generating step.

10. A computer program product, comprising a non-transitory machine-readable storage medium having encoded therein executable code of one or more software programs, wherein the one or more software programs when executed by at least one processing device perform the following steps:
    obtaining time series data and an indication of one or more seasonal components in said time series data;
    separating the time series data into data chunks of a predefined length based at least in part on said indication of at least one of said seasonal components;
    aligning the data chunks based on said at least one seasonal component;
    generating one or more of an image and a multi-dimensional vector using the aligned data chunks; and
    applying one or more of said image and said multi-dimensional vector to a Deep Learning module to obtain one or more of at least one prediction, at least one classification and at least one profiling of one or more parameters associated with said time series data.

11. The computer program product of claim 10, wherein said aligning step positions time series data in a vicinity of related seasonal data.

12. The computer program product of claim 10, wherein said at least one classification of said one or more parameters associated with said time series data comprises an anomaly detection.

13. The computer program product of claim 10, wherein said at least one profiling of said one or more parameters associated with said time series data comprises one or more of a clustering of said one or more parameters and a behavior identification.

14. An apparatus, comprising:
    a memory; and
    at least one processing device, coupled to the memory, operative to implement the following steps:
    obtaining time series data and an indication of one or more seasonal components in said time series data;
    separating the time series data into data chunks of a predefined length based at least in part on said indication of at least one of said seasonal components;
    aligning the data chunks based on said at least one seasonal component;
    generating one or more of an image and a multi-dimensional vector using the aligned data chunks; and
    applying one or more of said image and said multi-dimensional vector to a Deep Learning module to obtain one or more of at least one prediction, at least one classification and at least one profiling of one or more parameters associated with said time series data.

15. The apparatus of claim 14, wherein said aligning step positions time series data in a vicinity of related seasonal data.

16. The apparatus of claim 14, further comprising the step of stacking said data chunks based on said at least one seasonal component in a plurality of dimensions, prior to said generating step.

17. The apparatus of claim 14, further comprising the step of converting an output said Deep Learning module back to a time series data format.

18. The apparatus of claim 14, wherein said at least one classification of said one or more parameters associated with said time series data comprises an anomaly detection.

19. The apparatus of claim 14, wherein said at least one profiling of said one or more parameters associated with said time series data comprises one or more of a clustering of said one or more parameters and a behavior identification.

20. The apparatus of claim 14, wherein one or more parameters of said Deep Learning module are predefined by an external training routine prior to the generating step.

\* \* \* \* \*